United States Patent [19]

Gamell

[11] 4,003,672
[45] Jan. 18, 1977

[54] INTERNAL COMBUSTION ENGINE HAVING COAXIALLY MOUNTED COMPRESSOR, COMBUSTION CHAMBER, AND TURBINE

[75] Inventor: Joseph A. Gamell, Kalamazoo, Mich.

[73] Assignee: Joseph Gamell Industries, Incorporated, Kalamazoo, Mich.

[22] Filed: Feb. 26, 1975

[21] Appl. No.: 553,281

Related U.S. Application Data

[62] Division of Ser. No. 401,206, Sept. 27, 1973, Pat. No. 3,886,732.

[52] U.S. Cl. .................................... 415/71; 415/90; 416/177
[51] Int. Cl.² .............................................. F01D 5/00
[58] Field of Search .................... 415/71, 95, 90; 416/176, 177, 179; 60/39.35

[56] References Cited

UNITED STATES PATENTS

| 863,250 | 8/1907 | Abbe | 415/71 |
|---|---|---|---|
| 1,009,534 | 11/1911 | Lamberti | 415/71 |
| 1,033,738 | 7/1912 | Scott et al. | 415/71 |
| 1,036,902 | 8/1912 | Porter | 415/71 |
| 1,356,106 | 10/1920 | Machado | 415/71 |
| 1,641,833 | 9/1927 | Strong | 416/177 |
| 2,990,107 | 6/1961 | Edwards | 415/71 |

FOREIGN PATENTS OR APPLICATIONS

| 22,573 | 1893 | United Kingdom | 415/71 |

Primary Examiner—C. J. Husar
Attorney, Agent, or Firm—Gordon W. Hueschen

[57] ABSTRACT

A turbine-type internal combustion engine comprising a support having coaxially mounted bearings, and a rotor assembly having shaft members rotatably mounted in said bearings and comprising a compressor, a combustion chamber, and a turbine all coaxially mounted and fixed with respect to each other, the compressor and the turbine each comprising a spiral web and a pair of radial plates affixed thereto, one on each side cooperating to define a spiral chamber, and a fuel supply having a fuel duct mounted at one end of said rotor and extending into said combustion chamber.

4 Claims, 3 Drawing Figures

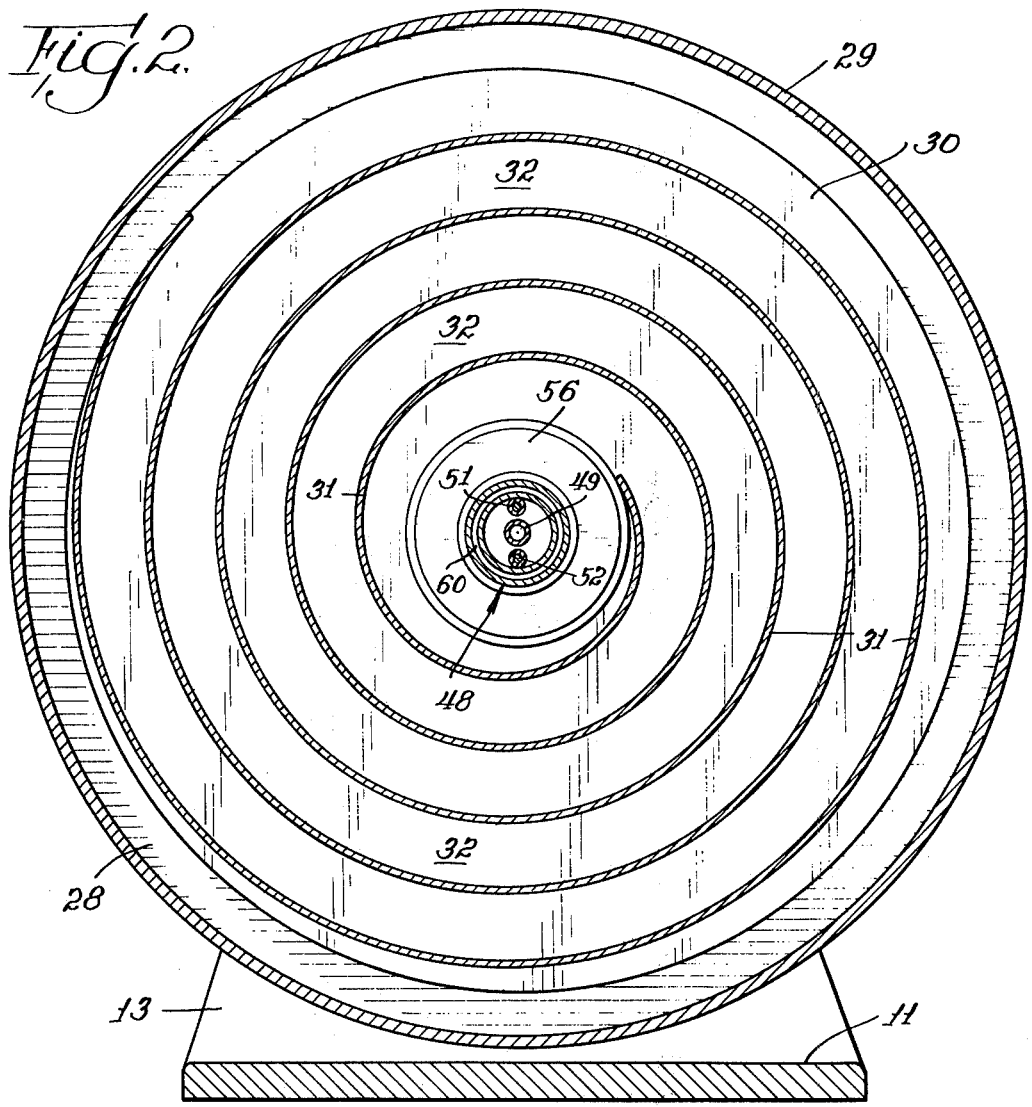
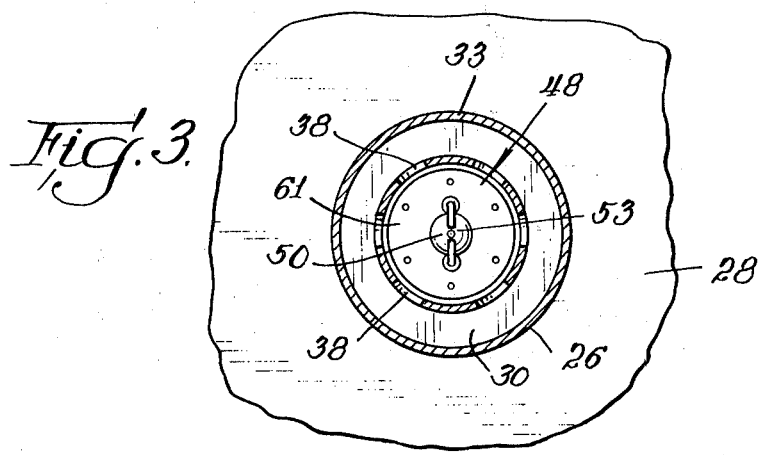

INTERNAL COMBUSTION ENGINE HAVING COAXIALLY MOUNTED COMPRESSOR, COMBUSTION CHAMBER, AND TURBINE

This is a division of application Ser. No. 401,206, filed Sept. 27, 1973, now U.S. Pat. No. 3,886,732.

BACKGROUND OF THE INVENTION

1. Field of Invention

The present invention relates to internal combustion engines of the turbine type, more particularly relating to such an engine having coaxially mounted components.

2. Prior Art

Turbine-type internal combustion engines have been disclosed in the art. Generally they comprise individually mounted and operated compressors, combustion chambers, and turbines. Such engines are very expensive and complicated, lack desired efficiency and require many moving parts.

OBJECTS OF THE INVENTION

It is an object of the invention to provide an internal combustion-type engine having few moving parts. It is a further object to provide an internal combustion engine which is highly efficient to operate. It is an additional object to provide an engine which is inexpensive to build and operate. Still other objects will readily present themselves to one skilled in the art upon reference to the ensuing specification, the drawings, and the claims.

SUMMARY OF THE INVENTION

According to the present invention, an internal combustion-type engine is provided comprising a bearing support, and a rotor having a compressor, a combustion chamber and ducts, and a turbine all coaxially mounted for rotation as a single unit. The compressor and the turbine are each formed of a spiral web having radial plates mounted at each end defining a spiral chamber which serves in the compressor to compress the air and in the turbine to rotate the rotor assembly and attached power shaft to provide motive power.

BRIEF DESCRIPTION OF THE DRAWINGS

In the drawings,

FIG. 2 is a cross-sectional view taken at the line 2—2 of FIG. 1, looking in the direction of the arrows, and FIG. 3 is a cross-sectional view taken at the line 3—3 of FIG. 1, looking in the direction of the arrows.

DESCRIPTION OF THE PREFERRED EMBODIMENT

Figure 1:
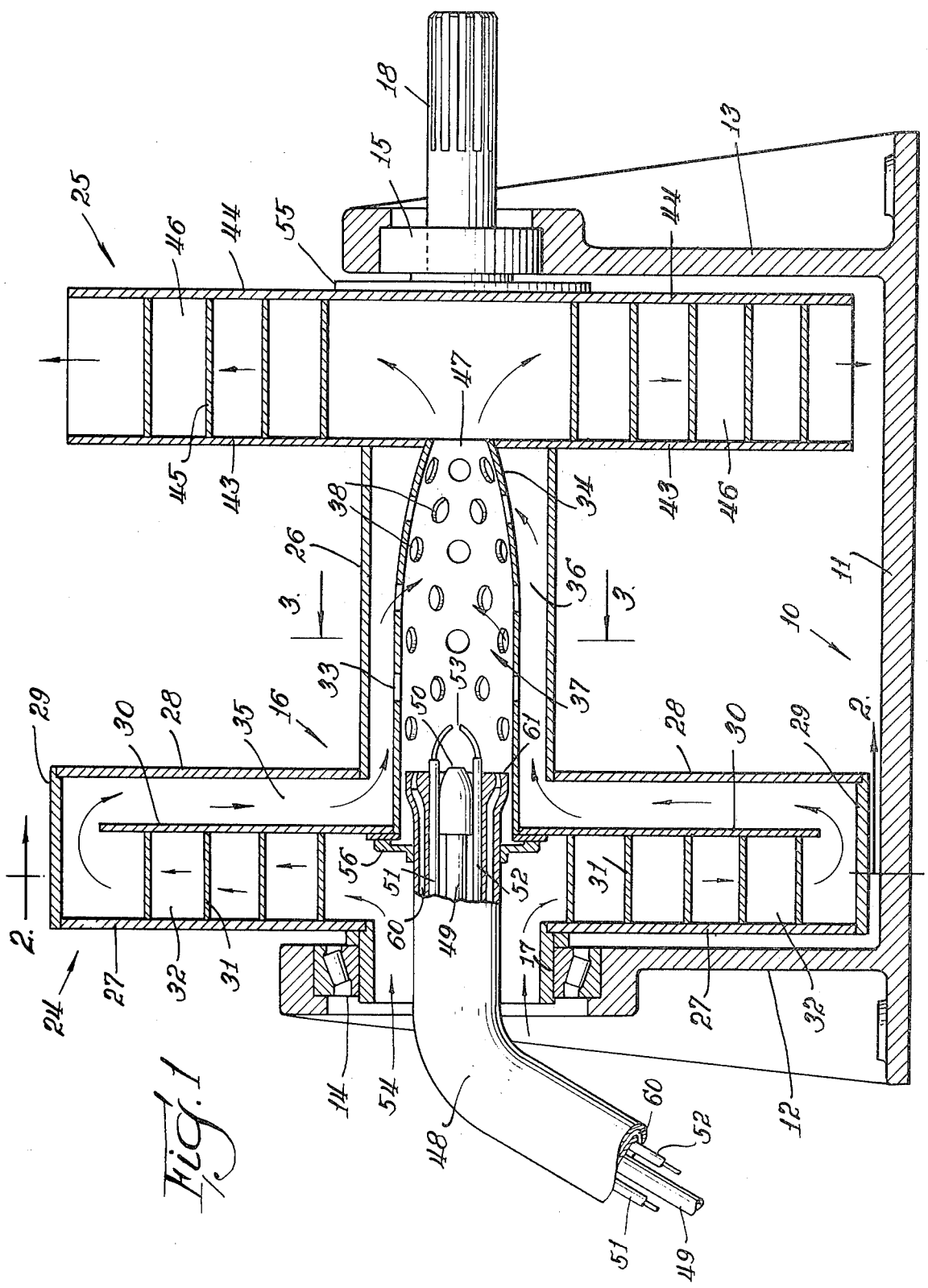
FIG. 1 is an axial cross-sectional view showing the internal combustion engine of the invention.

Referring to FIGS. 1-3, the internal combustion engine 10 of the invention is shown comprising a base 11 having vertical bearing supports 12 and 13 with bearing assemblies 14 and 15 mounted at the ends thereof. An integral rotor subassembly 16 is provided with a tubular shaft 17 at one end and a solid cylindrical power transmitting shaft 18 at the other end journaled in the bearing assemblies 14 and 15, respectively.

The rotor subassembly 16 generally comprises a compressor 24 at one end and a turbine 25 at the other maintained in fixed spaced-apart relationship by direct connection to the end of a tubular housing or hub 26.

The compressor is formed of outer radial walls 27 and 28 connected together by means of a peripheral axial wall 29 to form a partially closed chamber. The outer radial wall 28 is provided with an axial aperture and is affixed to one end of the tubular hub 26. The outer radial wall 27 is provided with a central aperture and is affixed at the inward edge to the tubular shaft 17.

The compressor 24 is additionally provided with an inner radial wall 30 and a spiral partition web 31 disposed between and affixed at its edges by welding or other suitable means to the outer radial wall 27 and the inner radial wall 30, the structure cooperating to define a spiral chamber 32. The inner radial wall 30 has a central aperture to which is connected a tubular combustion housing 33 having a tapered end 34. The inner radial wall 30 cooperates with the outer radial wall 28 to define a cylindrical radial duct 35 communicating with a tubular compressed air duct 36 formed between the hub 26 and the combustion housing 33. Within the combustion housing 33 is a combustion chamber 37 communicating with the compressed air duct 36 by means of apertures 38.

The turbine 25 is formed of outer radial walls 43 and 44 affixed to the edges of a spiral partition web 45 by such means as welding. Alternatively, the structure may be affixed by means of bolts or other suitable means. The radial walls 43 and 44 and the partition web 45 cooperate to define a spiral chamber 46. The outer radial wall 43 is affixed to one end of the hub 26 by suitable means such as welding and is provided with a central port 47 and is affixed to the tapered end 34 of the combustion chamber 33 at the port 47, thereby connecting the combustion chamber 37 with the spiral chamber 46. Although the spiral webs 31 and 45 have each been shown and described as single units, two or more webs may be interwoven in each unit if desired. However, for optimum efficiency each separate web member should extend for at least 360°, that is, a full turn.

A fuel supply duct 48 is fixedly mounted on the apparatus by suitable means and extends through the central portion of the compressor 24 and into the combustion chamber 37. The supply duct 48 has a central tube 49 through which the fuel is supplied terminating in a fuel supply jet 50 through which the fuel is expelled with the proper force and configuration. Ignition wires 51 and 52 are mounted on the supply duct 48 and are terminated in an ignition gap 53 utilized to ignite the fuel injected into the combustion chamber 37. An air intake port 54 is provided intermediate the inner wall of the tubular shaft 17 and the fuel supply duct 48. A seal bearing 56 affixed to the duct 48 and having a sealant surface sealingly engaging the inner surface of the combustion housing prevents fuel and compressed air from backing into the compressor central chamber, and may be formed of any suitable heat-resistant material such as brass or bronze or any other bearing material. Power is provided by the rotor assembly through the shaft 18 which is affixed to the outer radial wall 44 by means of a flange 55.

If desired, water or steam may be injected into the internal combustion engine of the present invention in order to attain the proven advantages of such procedure, such as the reduction of nitric oxide exhaust products and increasing the combustion efficiency of the engine. A means for providing water or steam injection is shown in the drawings and comprises a tubular duct 60 contained in the main fuel supply duct 48, and connected to a collar or doughnut-type nozzle 61. The injection of water additionally offers the advantages that it assists in cooling the combustion chamber and additionally serves to cool the seal bearing 56 when the water in the tubular duct 60 passes below and in proximity with the bearing 56.

In operation, fuel such as kerosene, gasoline, diesel fuel, or any other suitable fuel, is supplied to the fuel supply duct 49 and as it passes out of the supply jet 50 it is ignited by an electrical discharge across the gap 53. Air is drawn in through the duct 54, and into the combustion chamber where it mixes with the ignited fuel and supports combustion, causing a high pressure combustion stream to travel through the port 47, through the spiral chamber 46 and out into the atmosphere through suitable exhaust means (not shown). If desired, a suitable exhaust system may be utilized, such as an annular housing around the edge of the turbine 25 for collecting and venting exhaust gases. As the expanded gas passes through the spiral chamber 46 it causes the turbine 25 to rotate, which, being affixed to the entire rotor, causes the entire rotor including the compressor 24 to rotate. As the compressor 28 rotates, air is drawn in through the air intake port 54, into the spiral chamber 32 where it is compressed as a result of the centrifugal force of the rotative movement, propelled through the duct 30, into the duct 36, and into the combustion chamber 37 through the apertures 38. The application of high pressure air causes the fuel to burn with increased efficiency, thereby providing even greater gas pressure to the turbine 25 and causing the entire rotor to rotate at high speed.

The internal combustion engine of the present invention has many advantages over prior art engines of the turbine type. Because the combustion chamber is mounted in the tubular hub and coaxially mounted with respect to both the compressor and turbine, a better mixture of fuel and compressed air is provided as a result of the continual rotation. The fuel supply duct and nozzle are stationary and the need for specialized or exotic seals is obviated since, after combustion, the gases move to exhaust the turbine. The need for costly seals has been one of the major problems attendant to turbine engines. In the present engine this problem is overcome since in the present design the highest compression of air takes place on the outer rim of the compressor. This structure also has the benefit of reducing compressor temperatures as the laminar peripheral layers of air caused by high speed rotation serves to remove heat. The continually expanding design of the compressor also permits the air molecules to be compressed both by increasing centrifugal force and by accelerating at high velocities. The high velocities of the air molecules are transformed into pressure in the turbine section.

The turbine structure is unique in its function as it converts heat energy into mechanical energy more efficiently than previously known systems. Also it eliminates seal problems because of the rotating structure. Further, because of the unique construction in both the compressor and turbine wherein a spirally oriented web is permanently affixed at its edges to two radial walls this provides a structure which can be very simply and inexpensively produced and yet provides a spiral channel which is free from leakage from one tunnel segment to the other. Moreover, in the compressor structure, a third inner radial wall is provided cooperating with one of the outer radial walls and the spiral web to provide compression, and having a radial duct intermediate the inner radial wall and the other radial wall serving as a duct whereby the compressed air may be directed to the center of the structure and discharged into an air passage located at the center. Additionally, as shown and described, water injection may be readily applied to the engine, with its well-known advantages.

It is to be understood that the invention is not to be limited to the exact details of operation or structures shown and described, as obvious modifications and equivalents will be apparent to one skilled in the art.

I claim:

1. A compressor adapted for use in an internal combustion engine comprising an axially disposed, tubular housing, a first outer radial wall having an axial inlet therein, a second outer radial wall affixed to and projecting radially from one end of said housing and having an axial outlet communicating directly with said housing, a peripheral axial wall connecting said first and second outer radial walls and forming therewith a cylinder which is concentric with said housing, but which has a substantially larger diameter, and an inner radial wall mounted intermediate said first and second outer radial walls and of smaller diameter than said outer radial walls, whereby the periphery thereof is uniformly spaced from said peripheral axial wall, and a spiral web intermediate said first outer wall and said inner wall having its edges affixed to said walls, cooperating to define a spiral chamber, said inner radial wall and said second outer radial wall cooperating to define a radial duct communicating with said housing through said axial outlet, and said spiral chamber communicating at its innermost end with said inlet and at its outermost end with said radial duct, the sole communication between said inlet and said housing being through said spiral chamber, said radial duct, and said axial outlet, and bearing means for supporting said compressor for rotation about its axis.

2. A compressor according to claim 1, having a plurality of interpositioned spiral webs each having at least one complete turn.

3. A compressor according to claim 1, in which the axial inlet is an axial circular aperture and in which the bearing means comprises an axially disposed, tubular shaft affixed at the inward edge of said tubular shaft to said first outer radial wall and forming a tubular extension of said aperture.

4. A compressor according to claim 3, in which the bearing means comprises means for rotatably supporting said tubular housing adjacent the end thereof opposite said tubular shaft.

* * * * *